United States Patent [19]
Klim

[11] Patent Number: 6,092,620
[45] Date of Patent: Jul. 25, 2000

[54] SUPPORT FRAME

[76] Inventor: Rory Klim, Box 194, Dugald, Manitoba, Canada, R0E 0K0

[21] Appl. No.: 09/158,082

[22] Filed: Sep. 22, 1998

[51] Int. Cl.$^7$ .................................................. E04G 1/00
[52] U.S. Cl. ...................... 181/151; 181/20; 280/47.27; 280/654; 403/205; 16/29; 16/30; 52/651.1; 52/653.2; 52/654.1; 52/655.1; 52/656.9
[58] Field of Search ................................. 52/633, 653.2, 52/656.9, 239, 651.01, 651.1, 654.1, 655.1, 656.4, 637; 16/29, 30; 47/44–47; 403/205, 403; 280/47.27, 47.28, 47.29, 47.18, 652, 654; 182/181.1, 151, 178.1, 200

[56] References Cited

U.S. PATENT DOCUMENTS

| | | |
|---|---|---|
| 199,353 | 1/1878 | Clark . |
| 444,960 | 1/1891 | Priday ........................................ 52/633 |
| 1,765,985 | 6/1930 | McHaffie . |
| 3,420,030 | 1/1969 | Kosmach et al. . |
| 3,424,178 | 1/1969 | Yazaki .................................. 135/909 X |
| 3,819,755 | 6/1974 | Berger et al. . |
| 4,064,999 | 12/1977 | Young ................................ 52/651.1 X |
| 4,086,980 | 5/1978 | Shortes et al. .......................... 181/151 |
| 4,922,653 | 5/1990 | Stone . |
| 5,069,309 | 12/1991 | Swiderski et al. ............... 181/178.1 X |
| 5,308,103 | 5/1994 | Chin-Shung ............................ 280/655 |
| 5,330,064 | 7/1994 | Hall ........................................ 211/182 |
| 5,476,282 | 12/1995 | Dahl ....................................... 280/651 |
| 5,526,614 | 6/1996 | Huang ........................................ 52/13 |
| 5,727,284 | 3/1998 | Deutsch ..................................... 16/30 |
| 5,742,977 | 4/1998 | Hoofe ........................................ 16/30 |
| 5,960,605 | 10/1999 | Hope ....................................... 52/656.7 |

*Primary Examiner*—Robert Canfield
*Attorney, Agent, or Firm*—Adrian D. Battison; Murray E. Thrift

[57] ABSTRACT

A kit for assembling modular support structures is described. The kit comprises structural members and joining means. The joining means further comprise straight members, angle members and "T"-shaped members. A variety of different support structures of different shapes and sizes can be assembled by inserting the ends of the structural members into the ends of the various joining means. Furthermore, angle members may be arranged to include wheeled means, allowing for the construction of mobile support structures.

15 Claims, 4 Drawing Sheets

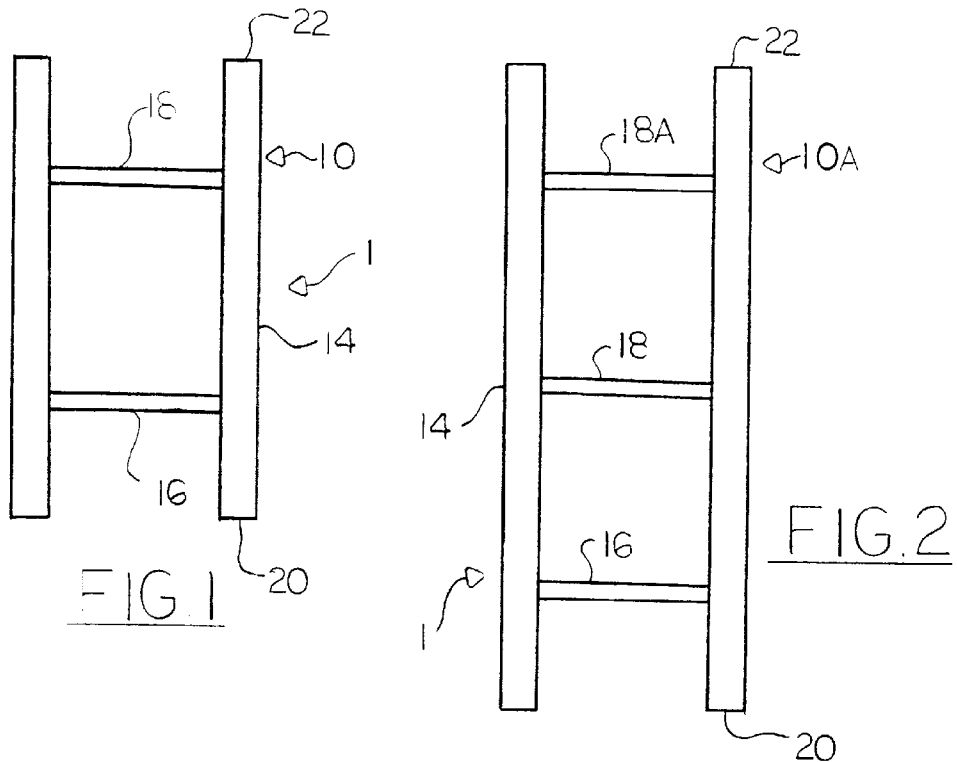
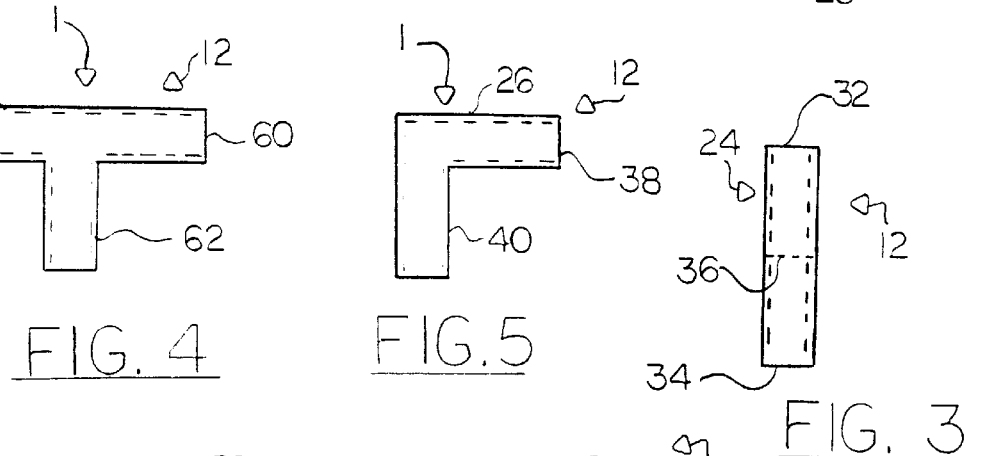
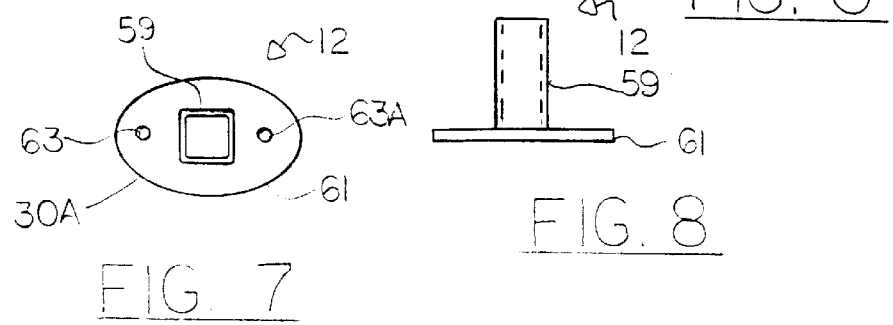

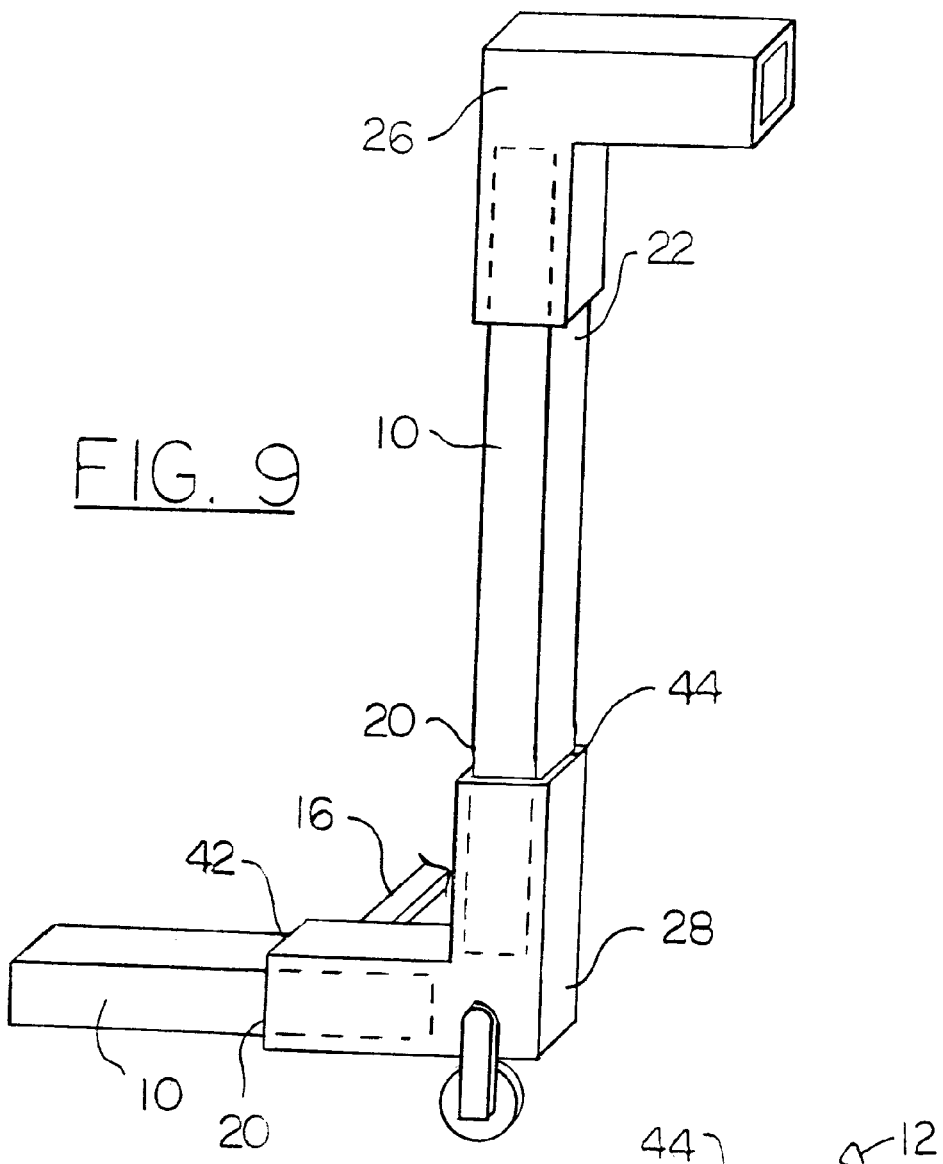
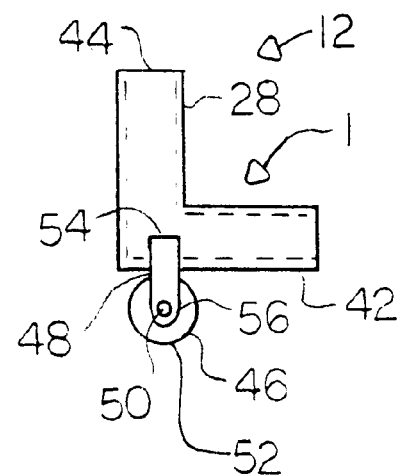

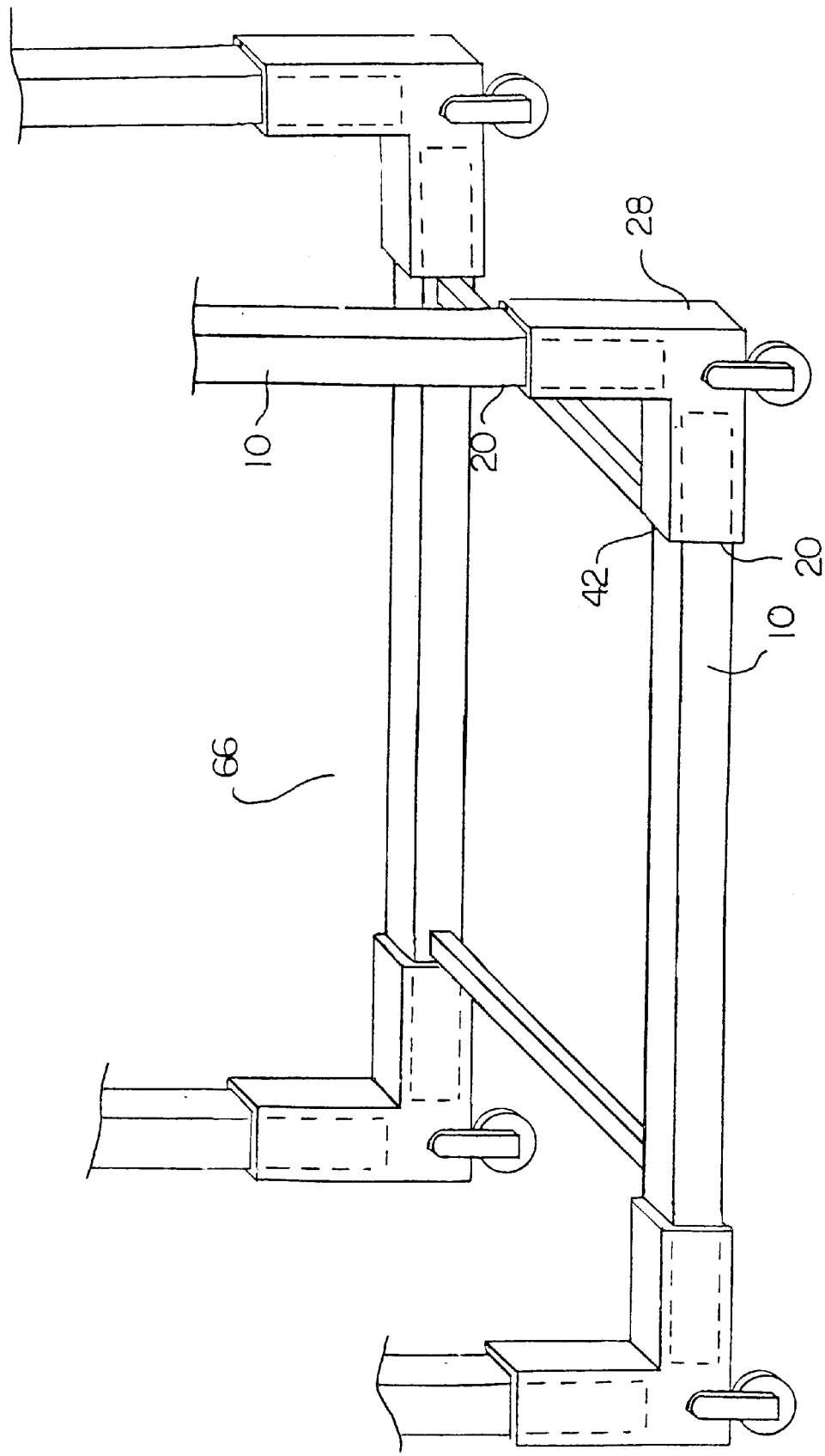

SUPPORT FRAME

The present invention relates to a kit for assembling modular support structures.

BACKGROUND OF THE INVENTION

One of the difficulties encountered during construction work is that the specific shape and dimensions needed for various support structures such as scaffolds, handcarts and the like varies dramatically from construction site to construction site. Furthermore, it is virtually impossible to predict what support structures will be needed prior to arrival at the construction site. Clearly, a quick and efficient method for constructing a variety of support structures, preferably from a single set of components, is needed.

SUMMARY OF THE INVENTION

It is one object of the invention, therefore, to provide a method and a kit for assembling modular support structures.

According to a first aspect of the invention, there is provided a method for assembling modular support structures comprising:

providing a kit comprising:

structural members comprising two side members connected by two cross members at positions proximal to ends of the side members such that the two side members are perpendicular to the cross members and parallel to one another; and joining means for inter-connecting structural members comprising:

angle members comprising two open-ended tubes connected at a right angle;

"T"-shaped members comprising a first open-ended tube and a second open-ended tube connected end to end and a third open-ended tube attached at the connecting point of the first open-ended tube and the second open-ended tube such that the third open-ended tube is perpendicular to the first open-ended tube and the second open-ended tube; and straight members comprising two open-ended tubes connected end to end, including a support piece extending across the connecting point of the open-ended tubes; and inserting the ends of the side members into the open-ended tubes of the joining means, thereby forming a variety of structures, wherein the open-ended tubes have an inner diameter and the ends of the side members have an outer diameter such that the ends of the side members can be inserted into the open-ended tubes such that the open-ended tubes rest upon the cross members thereby providing additional stability to the support structures assembled.

Preferably, the angle members include wheeled means for assembling movable structures.

According to a second aspect of the invention, there is provided a kit for assembling modular structures comprising:

structural members comprising two side members connected by two cross members at positions proximal to ends of the side members such that the two side members are perpendicular to the cross members and parallel to one another; and joining means for inter-connecting structural members comprising:

angle members comprising two open-ended tubes connected at a right angle;

"T"-shaped members comprising a first open-ended tube and a second open-ended tube connected end to end and a third open-ended tube attached at the connecting point of the first open-ended tube and the second open-ended tube such that the third open-ended tube is perpendicular to the first open-ended tube and the second open-ended tube; and straight members comprising two open-ended tubes connected end to end, including a support piece extending across the connecting point of the open-ended tubes, wherein the open-ended tubes have an inner diameter and the ends of the side members have an outer diameter such that the ends of the side members can be inserted into the open-ended tubes such that the open-ended tubes rest upon the cross members thereby providing additional stability to the support structures assembled.

Preferably, the angle members include wheeled means for assembling movable structures.

Thus, the above-described kit can be used to construct a variety of support structures, such as scaffolds, handcarts and the like of various shapes and sizes from a single set of components.

BRIEF DESCRIPTION OF THE FIGURES

FIG. 1 is a top plan view of the structural member.

FIG. 2 is a top plan view of the second structural member.

FIG. 3 is a top plan view of the straight member.

FIG. 4 is a top plan view of the "T" shaped member.

FIG. 5 is a top plan view of the angle member.

FIG. 6 is a top plan view of the wheeled angle member.

FIG. 7 is a top elevational view of the support member.

FIG. 8 is a side elevational view of the support member.

FIG. 9 is an isometric view of the handcart assembled using the component of FIGS. 1 to 8.

FIG. 10 is an isometric view of the scaffold unit assembled using the components of FIGS. 1 to 8.

DETAILED DESCRIPTION

Figure 11:
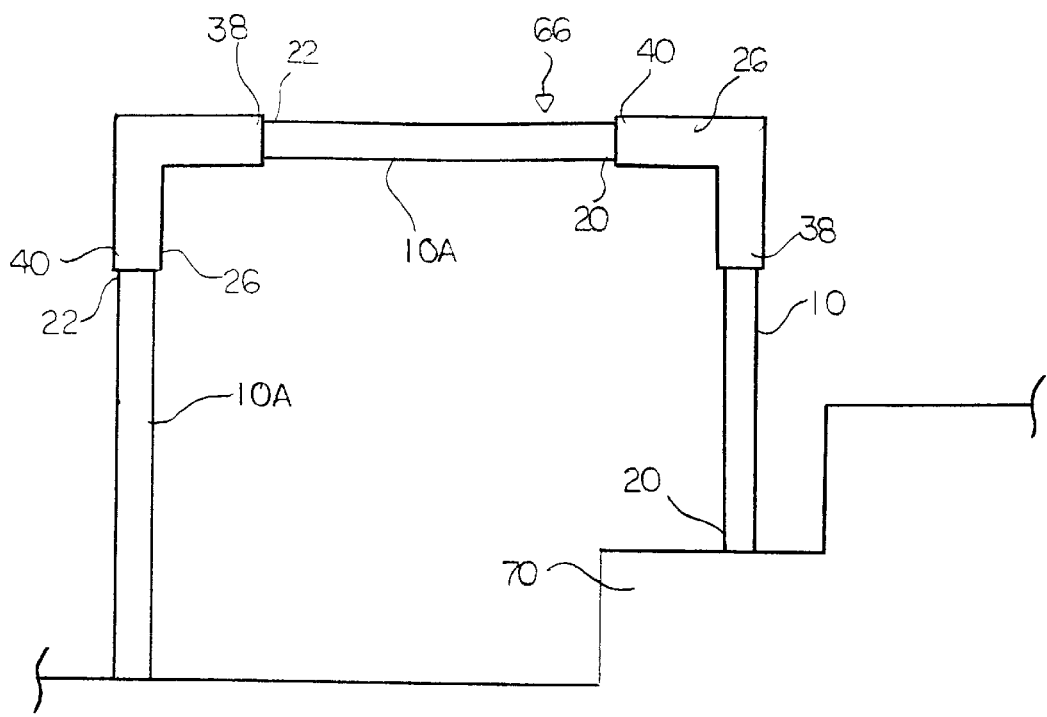
FIG. 11 is a side elevational view of the scaffold with one structural member on a staircase.

In FIGS. 1 to 8, the invention comprises a kit 1 for assembling a variety of modular support structures. The kit 1 comprises a plurality of structural members 10 and joining means 12, the details of which are shown in FIGS. 1 to 8.

The structural member 10, as shown in FIGS. 1 and 2, comprises two side members 14, a first cross member 16 and a second cross member 18. FIG. 2 shows a structural member 10A which is longer than structural member 10. Structural member 10A comprises a third cross member 18A located above cross member 18. The two side members 14 are elongate and further comprise a first end 20 and a second end 22. The two side members 14 are interconnected by the first cross member 16 at positions proximal to the first ends 20 of the side members such that the two side members 14 are perpendicular to the first cross member 16 and parallel to one another. Similarly, the two side members 14 are interconnected by the second cross member 18 at positions proximal to the second ends 22 of the side members 14 such that the two side members 14 are perpendicular to the second cross member 18 and parallel to one another. In the preferred embodiment, the first cross member 16 and the second cross member 18 are welded to the side members 14. Furthermore, the first end 20 and the second end 22 of the side members 14 have an outer diameter such that the joining means 12 can be fitted over the ends of the side members 14, as shown in FIGS. 3 to 8 and described below. The structural members 10 provide the basic framework for support structures assembled using the above-described kit 1. The joining means 12 are used to connect multiple structural members 10 as described below.

The joining means 12 comprise straight members 24, shown in FIG. 3, angle members 26, shown in FIG. 5, wheeled angle members 28, shown in FIG. 6, "T"-shaped members 30, shown in FIG. 4 and support members 30A, shown in FIGS. 7 and 8.

The straight members 24 comprise a first open-ended tube 32 and a second open-ended tube 34 connected end to end, and a support piece 36 extending across the interior of the straight member 24 at the connecting point of the first open-ended tube 32 and the second open-ended tube 34. The open-ended tubes have an inner diameter such that the ends of the side members can be inserted into the open-ended tubes. The structural members are arranged so that the open-ended tubes rest upon the cross members as described below. As described above, the straight members 24 are used to connect a first structural member to a second structural member such that both structural members are in the same plane. In other words, the straight members 24 are used to extend a support structure in one direction.

The angle members 26 comprise a first open-ended tube 38 and a second open-ended tube 40 connected end to end at a right angle. The open-ended tubes have an inner diameter such that the ends of the side members can be inserted into the open-ended tubes. The structural members are arranged so that the open-ended tubes rest upon the cross members as described below. As described below, the angle members 26 are used to connect a first structural member to a second structural member such that the two structural members lie in different planes. In other words, a support structure comprising two structural members connected by angle members 26 would therefore have a vertical component and a horizontal component.

The wheeled angle members 28 comprise a first open-ended tube 42 and a second open-ended tube 44 connected end to end so as to form a right angle, and wheeled means 46. The open-ended tubes have an inner diameter such that the ends of the side members can be inserted into the open-ended tubes. The structural members are arranged such that the open-ended tubes rest upon the cross members as described below. The wheeled means 46 comprise connecting means 48, an axle 50 and a wheel 52. The connecting means 48 comprises a first end 54 attached to the first open-ended tube 42 of the wheeled angle member 28 and a second end 56 attached to the axle 50. The wheel 52 is arranged for rotation about the axle 50. Furthermore, the exact diameter of the wheel 52 is variable, allowing for a greater range of possible applications. As with the angle members 26, the wheeled angle members 28 are used to connect a first structural member to a second structural member such that the two structural members lie in different planes. In other words, a support structure comprising two structural members connected by wheeled angle members 28 would therefore have a vertical component and a horizontal component. Furthermore, the wheel means 46 of the wheeled angle members 28 are used in the construction of support structures arranged for rolling motion, as described below.

The "T"-shaped members 30 comprise a first open-ended tube 58 and a second open-ended tube 60 connected end to end and a third open-ended tube 62 attached at the connecting point of the first open-ended tube 58 and the second open-ended tube 60 so that the third open-ended tube 62 is perpendicular to the first open-ended tube 58 and the second open-ended tube 60. The open-ended tubes have an inner diameter such that the ends of the side members can be inserted into the open-ended tubes. The structural members are arranged such that the open-ended tubes rest upon the cross members as described below. As described below, when the first open-ended tube 58 of the "T"-shaped member 30 is fitted over one end of a structural member, a second structural member can be inserted into the second open-ended tube 60 such that the support structure is extended in the first direction. Furthermore, a third structural member can be inserted into the third open-ended tube 62, thereby extending the support structure in a second direction. Of note is that in this arrangement the third structural member is perpendicular to both the first structural member and the second structural member.

Support members 30A comprise a open-end tube 59 which is fixed to a plate 61. The tube 59 is perpendicular to the plate 61. The plate has holes 63 and 63A located on opposing sides of the tube on the plate. The support member 30A is used to hold the module support structure in a fixed position.

Use of the above-described kit 1 to assemble modular support structures is described in detail based on examples; however, the invention is not limited to the examples.

In a first example, the above-described kit 1 is used to construct a hand cart 64, the details of which are shown in FIG. 9. A first structural member 10 serves as the base for the hand cart. The first ends 20 of the first structural member 10 are inserted into the first open-ended tubes 42 of two wheeled angle members 28, such that the end of the first open-ended tube 42 contacts the first cross member 16 of the structural member. This adds stability to the support structure and ensures that the end of the structural member is inserted to the proper depth. Next, the first ends 20 of a second structural member 10 are inserted into the second open-ended tubes 44 of the wheeled angle members 28. The second structural member 10 provides vertical support for the hand cart 64. Angle members 26 are fitted over the second ends 22 of the second structural member 10, and serve as handles for the assembled hand cart 64. In one embodiment, some of the angle members may be arranged to include grips to facilitate the use of these modified angle members as handles.

In a second example, the above-described kit 1 is used to construct a scaffold structure 66, the details of which are shown in FIG. 3. A first structural member 10 serves as the base for the scaffold. The first ends 20 of the first structural member 10 are inserted into the first open-ended tubes 42 of four wheeled members 28, such that the end of the first open-ended tube contacts the first cross member 16 of the structural member. This adds stability to the support structure and ensures that the end of the structural member is inserted to the proper depth. Next, the first ends 20 of a second structural member 10 are inserted into the second open-ended tubes 44 of the wheeled angle members 28. The second structural member 10 provides vertical support for the scaffold.

In a third example, the above described kit 1 is used to construct a scaffold assembled so the scaffold can be placed on a step, the details which are shown in FIG. 11. Three structural members 10 and 10A are used to support the scaffold. the structural member 10A extends vertically to an angle member 26. The first end 22 is inserted into the open-end 40 of the angle member 26. Then, the end 22 of the second structural member 10A is inserted into the open-end 38 of the angle member 26 so the second structural member is fixed in a horizontal position. Then second end 20 of the second structural member 10A is inserted into the open-end 40 of a second angle member 26. A third structural member 10, which is of appropriate length, is inserted into the second open-end 38 of the second angle member 26 so that the structural member is fixed in a vertical position parallel to the first structural member 10A. The first end 20 of the structural member 10 is placed on a step 70.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A support structure comprising:
    a plurality of rigid structural members each comprising two side members connected by at least two cross members at positions adjacent to but spaced from ends of the side members such that the two side members are perpendicular to the cross members and parallel to one another, the two side members of a respective structural member being formed by two parallel metal tubes which are connected by the cross members, each cross member comprising a metal member welded to each tube generally at right angles thereto; and
    a plurality of joining members inter-connecting the structural members, each joining member comprising two open-ended tubes connected at generally a right angle such that the connected structural members form a rigid structure;
    wherein the open-ended tubes have an inner surface and the ends of the side members have an outer surface shaped such that the ends of the side members are inserted as a free sliding fit into the open-ended tubes,
    wherein at least one of the structural members is positioned in a generally horizontal manner such that the cross members are parallel with a ground surface and at least two of the structural members are generally vertical and coupled to a respective end of the horizontal structural member by the joining members at generally right angles and extend downward therefrom such that the cross members of the vertical structural members are parallel, and;
    wherein there is provided an end flange member including a tubular portion for receiving an end of one of the side members of a structural member and a flange portion at right angles to the tubular portion.

2. The structure according to claim 1 wherein the length of the side members and the tubes are such that the open-ended tubes have an end face resting upon the cross members.

3. The structure according to claim 1 wherein there is provided a plurality of "T"-shaped members each comprising a first open-ended tube and a second open-ended tube connected end to end and a third open-ended tube attached at the connecting point of the first open-ended tube and the second open-ended tube such that the third open-ended tube is perpendicular to the first open-ended tube and the second open-ended tube wherein the open-ended tubes have an inner surface and the ends of the side members have an outer surface shaped such that the ends of the side members can be inserted into the open-ended tubes and the length of the members and the tubes are such that the open-ended tubes have an end face resting upon the cross members.

4. The structure according to claim 1 wherein the vertical structural members are of different lengths.

5. The structure according to claim 1 wherein there is provided a pair of straight connectors for joining two structural members end to end.

6. A support structure comprising:
    a plurality of rigid structural members each comprising two side members connected by at least two cross members at positions adjacent to but spaced from ends of the side members such that the two side members are perpendicular to the cross members and parallel to one another, the two side members of a respective structural member are two parallel metal tubes which are connected by the cross members, each cross member comprising a metal member welded to each tube at generally right angles thereto; and
    a plurality of joining members inter-connecting the structural members, each joining member comprising two open-ended tubes connected at generally a right angle such that the connected structural members form a rigid structure;
    wherein the open-ended tubes have an inner surface and the ends of the side members have an outer surface shaped such that the ends of the side members can be inserted as a free sliding fit into the open-ended tubes;
    wherein at least one of the structural members is positioned in a generally horizontal manner such that the cross members are parallel with a ground surface and at least two of the structural members are generally vertical and coupled to a respective end of the horizontal structural member by the joining members at generally right angles and extend upward therefrom such that the cross members of the vertical structural members are parallel to form a generally U-shaped construction and at least one wheel is located at a bottom side of the horizontal structural member for movement across the ground.

7. The structure according to claim 6 wherein said at least one wheel is mounted on a respective one of said joining members.

8. The structure according to claim 7 wherein at least said at least one wheel is mounted on one tube of the joining member on a side thereof facing away from the other tube.

9. The structure according to claim 6 wherein said at least one wheel is a caster wheel.

10. The structure according to claim 6 wherein the length of the side members and the tubes are such that the open-ended tubes have an end face resting upon the cross members.

11. The structure according to claim 6 wherein there is provided a plurality of "T"-shaped members each comprising a first open-ended tube and a second open-ended tube connected end to end and a third open-ended tube attached at the connecting point of the first open-ended tube and the second open-ended tube such that the third open-ended tube is perpendicular to the first open-ended tube and the second open-ended tube wherein the open-ended tubes have an inner surface and the ends of the side members have an outer surface shaped such that the ends of the side members can be inserted into the open-ended tubes and the length of the members and the tubes are such that the open-ended tubes have an end face resting upon the cross members.

12. The structure according to claim 6 wherein the vertical structural members are of different lengths.

13. A support structure comprising:

a plurality of rigid structural members each comprising two side members connected by at least two cross members at positions adjacent to but spaced from ends of the side members such that the two side members are perpendicular to the cross members and parallel to one another, the two side members of a respective structural member are two parallel metal tubes which are connected by the cross members, each cross member comprising a metal member welded across to each tube at generally right angles thereto; and a plurality of joining members inter-connecting the structural members each comprising two open-ended tubes connected at a generally right angle such that the connected structural members form a rigid structure;

wherein the open-ended tubes have an inner surface and the ends of the side members have an outer surface shaped such that the ends of the side members can be inserted as a free sliding fit into the open-ended tubes;

wherein at least one of the structural members is positioned in a generally horizontal manner such that the cross members are parallel with a ground surface and at least one of the structural members is generally vertical and coupled to a respective end of the horizontal structural member by the joining members at generally right angles and extends upward therefrom such that the cross members of the vertical structural members are parallel to form a generally L-shaped construction and at least one wheel is located at a bottom side of at least one of the joining members on one tube on a side thereof facing away from the other tube.

14. The structure according to claim 13 wherein the wheel is a caster wheel.

15. The structure according to claim 13 wherein the length of the members and the tubes are such that the open-ended tubes have an end face resting upon the cross members.

* * * * *